United States Patent
Nandyal

(10) Patent No.: US 6,662,913 B2
(45) Date of Patent: Dec. 16, 2003

(54) SHOCK ABSORBER

(75) Inventor: Srinath Nandyal, Pulaski, TN (US)

(73) Assignee: Gabriel Ride Control Products, Inc., Brentwood, TN (US)

( * ) Notice: Subject to any disclaimer, the term of this patent is extended or adjusted under 35 U.S.C. 154(b) by 0 days.

(21) Appl. No.: 10/203,061

(22) PCT Filed: Jan. 24, 2001

(86) PCT No.: PCT/US01/02393

§ 371 (c)(1),
(2), (4) Date: Oct. 24, 2002

(87) PCT Pub. No.: WO01/59325

PCT Pub. Date: Aug. 16, 2001

(65) Prior Publication Data

US 2003/0173167 A1 Sep. 18, 2003

Related U.S. Application Data

(60) Provisional application No. 60/180,967, filed on Feb. 8, 2000.

(51) Int. Cl.[7] ................ F16F 9/34; F16F 9/30
(52) U.S. Cl. ................ 188/322.15; 188/322.22
(58) Field of Search ........... 188/322.15, 322.22, 188/322.17, 322.18, 282.4, 282.5, 282.6, 282.8, 282.9, 283; 267/64.13

(56) References Cited

U.S. PATENT DOCUMENTS

| | | | |
|---|---|---|---|
| 2,574,209 A | 11/1951 | Funkhouser | 188/100 |
| 3,696,894 A | 10/1972 | Brady et al. | 188/275 |
| 4,113,072 A | 9/1978 | Palmer | 188/282 |
| 4,356,898 A | 11/1982 | Guzder et al. | 188/280 |
| 4,423,800 A | 1/1984 | Kobiske et al. | 188/277 |
| 4,747,475 A | 5/1988 | Hagwood et al. | 188/322.15 |
| 5,038,897 A | 8/1991 | Wells et al. | 188/311 |
| 5,769,190 A | 6/1998 | Deferme | 188/282.1 |

FOREIGN PATENT DOCUMENTS

| | | |
|---|---|---|
| JP | 4027612 | 1/1992 |
| JP | 5164174 | 6/1993 |

*Primary Examiner*—Jack Lavinder
*Assistant Examiner*—Xuan Lan Nguyen
(74) *Attorney, Agent, or Firm*—McAndrews, Held & Malloy, Ltd.

(57) ABSTRACT

A motor vehicle shock absorber (12) that has an additional or further spring biased fluid control valve (96) that disposed between the blow-off valve (46) and the compression chamber (34) of the shock absorber (12) and that provides enhanced damping performance characteristics during relatively low velocity movements of the piston assembly (24) in the recoil stroke direction, that is, at velocities lower than those which cause the blow-off valve (46) of the shock absorber (12) to open. The further spring biased fluid control valve (96) affords the shock absorber (12) a firmness vis-a-vis roll stability to the vehicle steering yet provides the consumer a desired "boulevard" or soft cushioned ride.

14 Claims, 3 Drawing Sheets

SHOCK ABSORBER

CROSS-REFERENCE TO RELATED APPLICATIONS

This application claims the priority of U.S. provisional application Serial No. 60/180,967, filed Feb. 8, 2000. The specification and drawings of that provisional application are hereby incorporated herein by reference thereto.

BACKGROUND OF THE INVENTION

The present invention relates to hydraulic shock absorbers. More particularly, the present invention relates to an improved hydraulic shock absorber that is adapted for use with motor vehicle suspension systems and that includes additional valving that enhances the dampening characteristics of the shock absorber during low velocity movement of the piston assembly in the recoil or rebound stroke or motion direction.

Hydraulic shock absorbers have long been commonly used in motor vehicle suspension systems to absorb unwanted road caused vibrations that normally occur while the vehicle is being driven. Specifically, shock absorbers are generally connected between the body (the sprung mass) and the suspension (the unsprung mass) of the motor vehicle to dampen vibrations transmitted from the suspension to the body.

Hydraulic shock absorbers usually include a cylindrical tube (frequently known as the inner tube), that defines a cylindrical inner cavity. A piston assembly is slidably disposed in and is reciprocally movable within the inner cavity and serves to divide the inner cavity into two working chambers: a compression chamber; and a rebound chamber, both of which are filled with hydraulic fluid. A fluid reservoir communicates, through valving, with the working chambers, and is usually annularly defined between the inner tube and an outer tube which is concentrically mounted about the inner tube.

One end of the outer or reservoir tube, normally the end adjacent to the compression chamber, is closed by an end cap assembly that is usually connected to the vehicle suspension by a suitable connector. A piston rod extends through a seal assembly and end cap mounted in the other end of the inner tube. The inner end of the piston rod is connected to the piston assembly, and the outer end of the piston rod is connected to the vehicle body by a suitable connector.

The piston assembly typically includes valving that permits fluid to flow across the piston assembly between the working chambers as the piston assembly moves relatively within the internal cavity, that is, relatively with respect to the inner tube. More specifically, the valving limits the flow of fluid across the piston assembly and between the compression and rebound chambers during movement of the piston assembly in a compression stroke direction or in a recoil stroke (sometimes also called the rebound or extension stroke) direction. This provides a damping force that "smoothes" or "dampens" vibrations transmitted from the suspension to the body. This damping force is, in part, determined by the velocity or speed at which the piston assembly is moved in the inner tube in response to the external forces applied to the shock absorber.

Various different types of valves or valving components have been used with piston assemblies to affect the damping force characteristics of shock absorbers. When a shock absorber piston assembly moves in the recoil stroke direction, these generally include restrictors or restrictor openings, a blow-off valve and orifices or orifice slots. The restrictors are usually holes drilled in the neck of the piston assembly although they may also be drilled in the piston rod. The blow-off valve is usually spring biased closed against a valve seat. The orifices are usually a plurality of rectangular slots coined in the valve seat of the blow-off valve.

During the recoil stroke of a shock absorber, the restrictors are the primary means by which fluid enters the piston assembly from the rebound chamber. Fluid then flows either through the orifice slots, or through the blow-off valve—when that valve's spring biasing force has been overcome—to the compression chamber. At low velocities of the suspension (that is, at low recoil stroke velocities of the piston assembly) the orifice slots are the primary contributors by way of the damping characteristics. At intermediate recoil stroke velocities of the suspension, it is the blow-off spring's biasing force that primarily determines the damping characteristics. At relatively high velocities, it is the restrictor openings that determine the damping characteristics. The restrictor openings do, of course, function at all velocities, but the contribution of the restrictors is significantly higher at higher velocities. The contribution of each of these valves or valving components is also dependent on the size of the orifice slots, the diameter of the restrictor openings, and the biasing force on the spring that biases the blow-off valve to a closed position.

Also in the past, some "premium" shock absorbers had piston assemblies in which additional valving was utilized to provide a more "plush" feel at lower operating velocities of the suspension. In these premium shock absorbers, the blow-off valves included valve members, which were spring biased against a valve seat, and in this respect, these valve members were like the valve members used in non-premium shock absorbers. The valve members of the premium-brand shock absorbers were, however, different in that they had an internal thin, flexible disk. This disk normally assumed a flat position and, while in this position, a relatively small flow of fluid was permitted to pass through the blow-off valve member when the blow-off valve was otherwise spring biased closed. This flow through the blow-off valve disk was in addition to the flow through the orifices. Increased fluid flow, resulting from a higher piston assembly velocity, caused the flexible valve disk to assume a flexed, bent or curved position. When in its flexed position, the disk prevented this further fluid flow through the blow-off valve member. The disk assumed its flexed or closed position before the piston assembly velocity caused the blow-off valve to open against the force of its spring bias.

SUMMARY OF THE INVENTION

In principal aspects, the improved shock absorber of the present invention includes a further valve that enhances the damping performance of the shock absorber during low velocity movement of the piston assembly in the recoil stroke direction. This novel valve includes a second spring-loaded valve member that normally blocks the flow of fluid past or across the piston assembly downstream, so to speak, from the blow-off valve, that is, after the fluid has flowed through the orifices, and/or through the valve disk that has been used in some premium shock absorbers. This further valve provides an initial firmness to the suspension movement before the blow-off valve opens, and more specifically, offers a firmness vis-a-vis roll stability to the vehicle steering yet provides the desired "boulevard" or soft ride that is particularly desired by consumers.

An object of the present invention is to provide an improved shock absorber, as described, where the shock absorber is adapted for connection between the body of a motor vehicle and the suspension of the motor vehicle and serves to dampen vibrations transmitted from the suspension to the body while the vehicle is being driven.

Another object of the present invention is to provide an improved shock absorber, as described, that includes further valving, as described, and that affords advantageous firmness regarding vehicle steering roll stability, together with a boulevard or soft ride, during relatively low velocity movement of the piston assembly in the recoil stroke direction. A related object of the present invention is to provide an improved shock absorber, as described, where the shock absorber includes: an inner tube having a first fluid filled cylindrical internal or inner cavity, that has compression and extension ends and that has a longitudinal central axis extending between the compression and extension ends; a piston assembly that has a longitudinal central axis co-axial with the longitudinal central axis of the inner tube, that has a second internal chamber and a third chamber, that is disposed in and reciprocally moveable, within the internal first cavity, selectively in a recoil stroke direction and in a compression stroke direction, and that serves to divide the internal cavity into a compression and rebound chambers; a restrictor opening for permitting restrictive flow of fluid between the rebound chamber and the second chamber of the piston assembly during movement of the piston assembly in the recoil stroke direction; an orifice for permitting a first predetermined volume of fluid to flow between the second chamber and the third chamber during relatively low velocity movement of the piston assembly in the recoil stroke direction; a blow-off valve that is in the piston assembly between the second chamber and the third chamber, that when opened, permits a relatively large volume of fluid, as compared to the first predetermined volume of fluid flow, to flow from the second chamber to the third chamber, and that is normally biased closed with a first predetermined biasing force; piston rod that has a longitudinal central axis, co-axial with the longitudinal central axis of the inner tube, that has an inner end connected with the piston assembly, and that has an outer end extending out of the extension end of the inner tube; and a further or second valve that is in the piston assembly between the blow-off valve and the compression chamber, that when open, permits a relatively large volume of fluid, as compared to the first predetermined volume of fluid, to flow from the third chamber to the compression chamber, and that is normally biased to a closed position with a second predetermined biasing force, which is less than the first predetermined biasing force, so that the second valve provides an initial firmness to the shock absorber damping before the blow-off valve opens and affords the shock absorber a firmness in regard to the roll stability to the vehicle steering yet providing a relatively soft cushioned or boulevard ride for the vehicle.

A still further object of the present invention is to provide an improved shock absorber, as described, where a first valve seat is defined adjacent to the end of the piston assembly adjacent to the compression chamber, where the second valve includes a second valve member, and where a first coil compression spring biases the valve member against the first valve seat to close the second valve, where the first valve seat is annular, where the first coil compression spring is disposed without the third chamber, where the longitudinal central axes of the first coil compression spring and the inner tube are coaxial, and where the first valve seat is annularly disposed about the longitudinal axis of the piston assembly.

These and other objects, advantages and benefits of the present invention will become more apparent from the following description of the preferred embodiment of the invention taken in conjunction with the following drawings.

In the following description of the preferred embodiment of the present invention, the terms "upper" and "lower" and "inner" and "outer" are used, for convenient reference, to describe parts of the shock absorber as those parts appear in the FIGURES, their usage is not intended to otherwise limit the scope of the invention or how the shock absorber might be oriented when in actual use.

DETAILED DESCRIPTION OF THE PREFERRED EMBODIMENT

Figure 1:
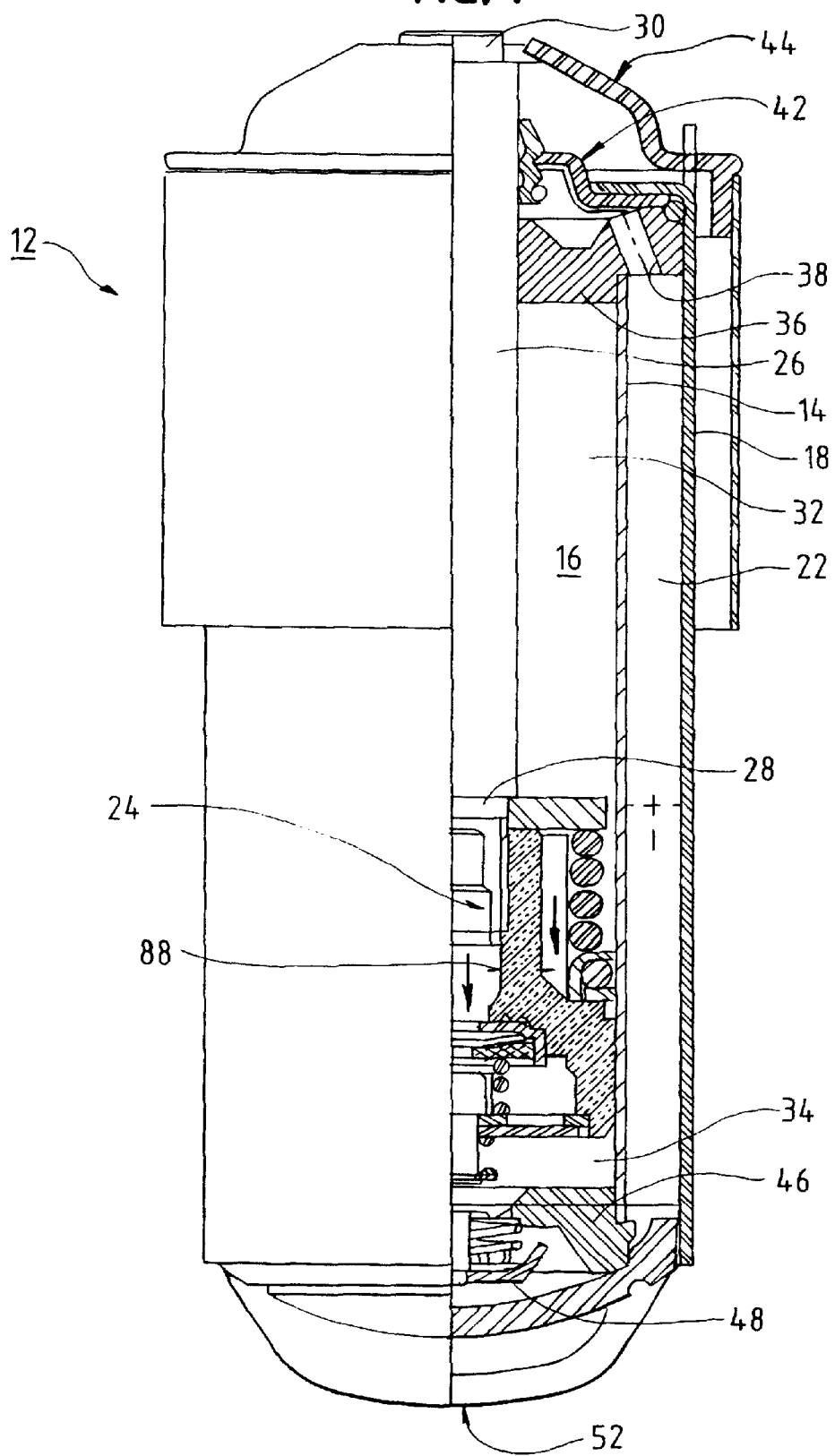
FIG. 1 is a partial, vertical cross-sectional view of an improved shock absorber of the present invention, taken along its central longitudinal axis.

A shock absorber 12, which includes the present invention, is generally shown in FIG. 1. The shock absorber 12 is of conventional design and construction except as noted below with respect to the additional or second valving. More specifically, the shock absorber includes a cylindrical inner tube 14 that defines a cylindrical internal or inner cavity 16. An outer tube 18 is positioned concentrically about and radially outwardly from the inner tube 14 so that their central longitudinal axes are coaxial. The annular space between the tubes 14 and 16 defines a reservoir 22 for the hydraulic fluid or oil used with the shock absorber 12.

A piston assembly 24, which will be described in more detail below, is disposed for reciprocal movement within the inner cavity 16. A piston rod 26 is connected at its lower or inner end 28 with the piston assembly 24 in a conventional manner. The outer or upper end 30 of the piston rod 26 extends without the inner cavity 14 in a conventional manner. The upper end 30 of the piston rod has a connector, not shown, which enables the shock absorber 12 to be connected with a vehicle body, not shown, in a conventional manner. The central longitudinal axes of the internal cavity 16, the tubes 14 and 18, piston assembly 24, and piston rod 26 are coaxial.

The piston assembly 24 divides the internal cavity 16 into: an extension, or sometime called rebound chamber 32, which is adjacent the upper end of the internal cavity, as shown in FIG. 1; and a compression chamber 34, which is adjacent the lower end of the inner cavity 16, as shown in FIG. 1.

The upper end, as shown in FIG. 1, of the shock absorber 12 is closed in a conventional manner. More specifically, the upper ends, again as shown in FIG. 1, of the tubes 14 and 16 are closed by an end cap 36. As is conventional, the end cap 36 may include valving, not shown, and passages, including the passage 38, for permitting fluid communication between the reservoir 22 and the extension chamber 32 in a conventional manner. A piston rod seal assembly 42 forms a seal about the outer peripheral surface of the piston rod 26 as it, and the piston assembly 24, reciprocally move within the inner cavity 16. As is also conventional, a cover member 44 encloses and protects the seal assembly 42 and end cap 36.

The lower end 46 of the compression chamber 34 and reservoir 22 are similarly closed in a conventional manner. More specifically, a compression head 46 is mounted within and closes the lower end of the inner tube 14. Conventional valving, including a replenishing valve, not shown, and a compression valve, shown at 48, are mounted in the compression head 46 so as to permit the fluid to flow between the reservoir 22 and the compression chamber 34.

An end cap 52 is mounted on the lower end, as shown in FIG. 1, of the outer tube 18, and with the head 46, closes both the lower end of the compression chamber 34, and the lower end of the reservoir 22 in a conventional manner. Additionally, a connector, not shown, may be mounted on the outer surface of the end cap 52 for connecting the lower end of the shock absorber with the vehicle suspension, also not shown.

Figure 2:
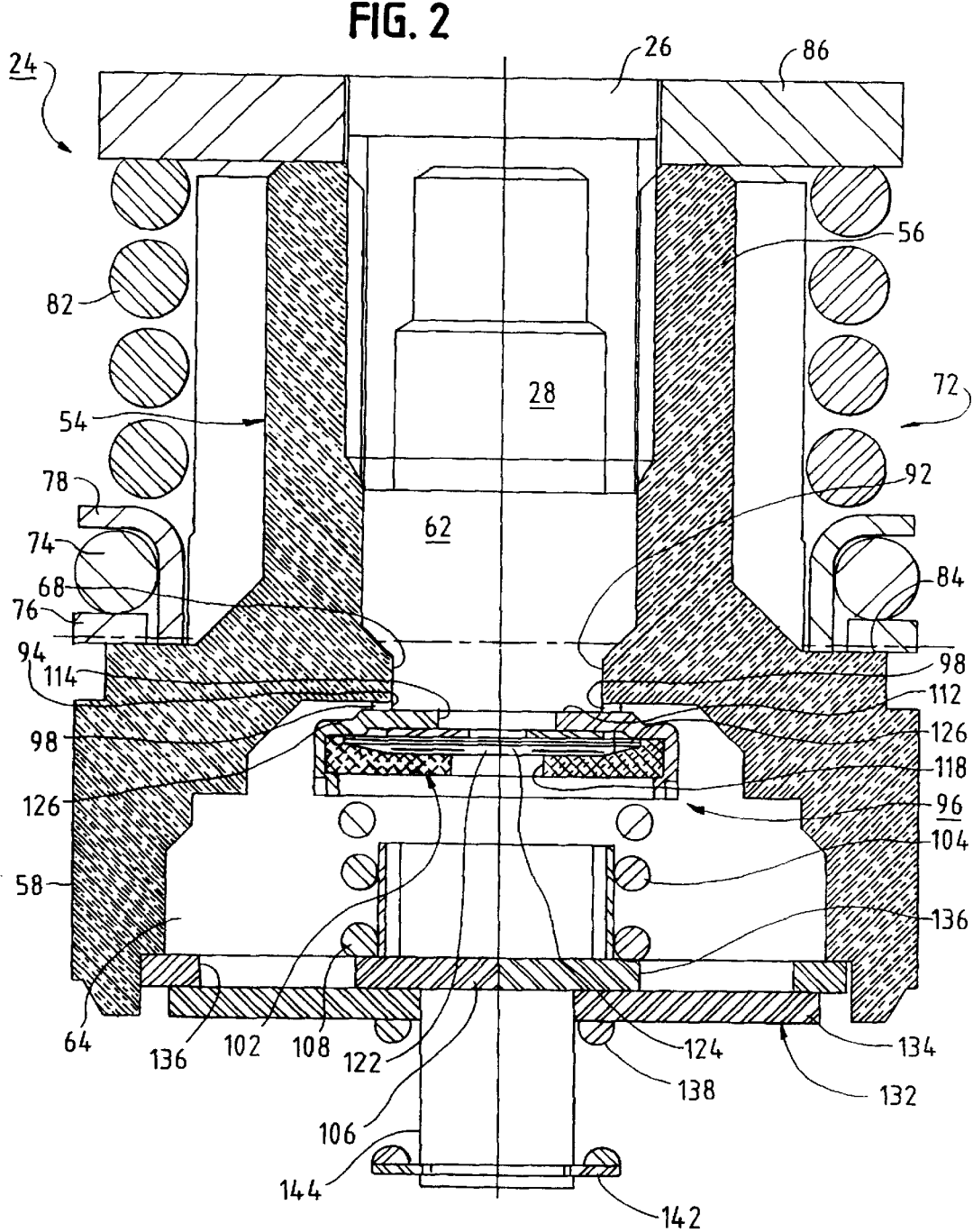
FIG. 2 is a vertical cross-sectional view of the piston assembly of the present invention, taken along its central longitudinal axis, where the blow-off valve and second valve are shown in their closed positions.
Figure 3:
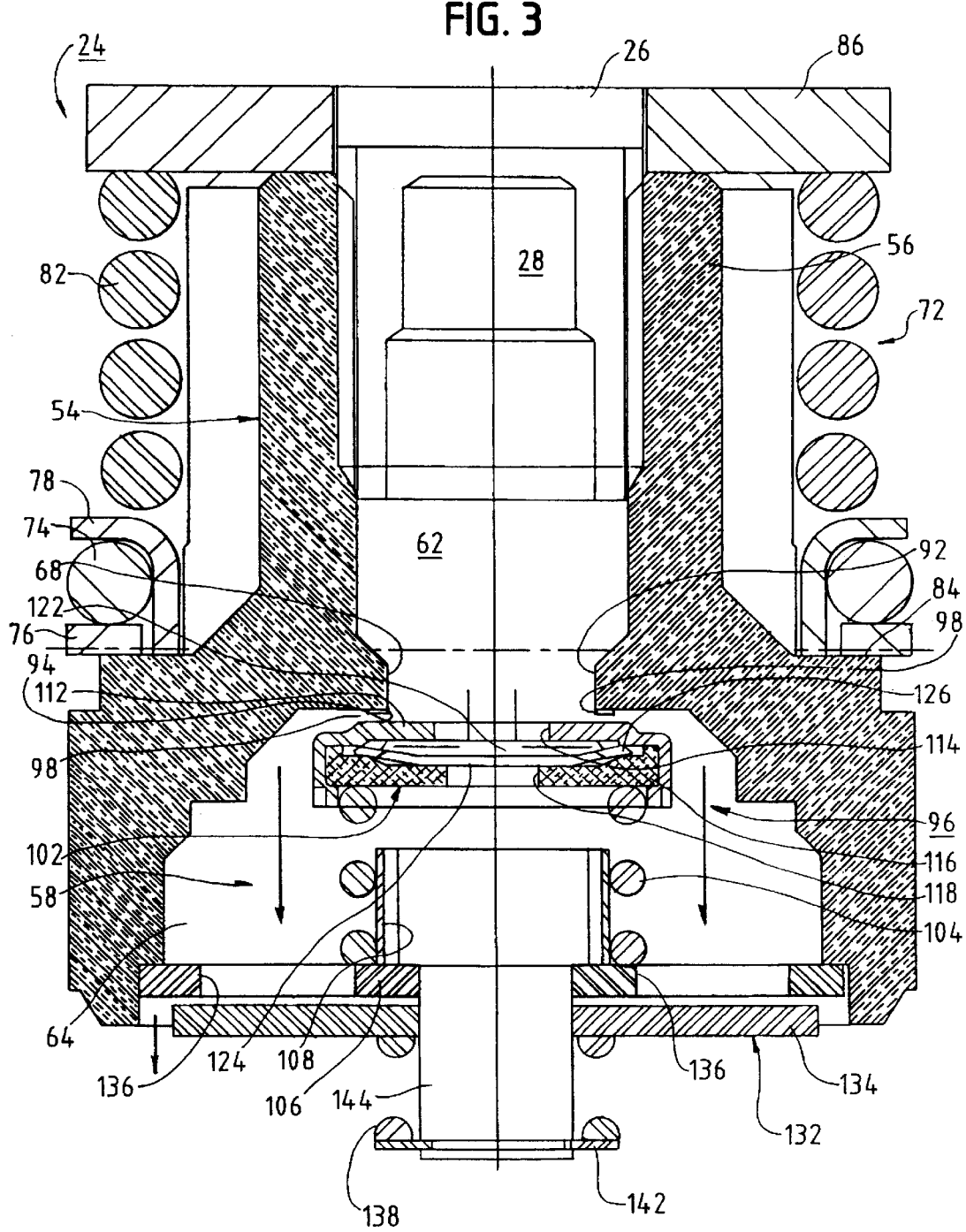
FIG. 3 is vertical cross-sectional view, similar to that shown in FIG. 2, of the piston assembly of the present invention where the blow-off valve and second valve are shown in their open positions.

Referring now to FIGS. 2 and 3, the piston assembly 24 includes a generally cylindrical piston body 54 that has an upper portion 56 and a lower portion 58. The lower end 28 of the piston rod 26 is connected with the upper portion 56 of the piston body in a conventional manner.

The upper portion 56 also includes a bore or internal chamber 62. The lower portion 58 of the piston body 54 likewise includes a lower counterbore or chamber 64. The upper chamber 62 has a relatively smaller diameter, as compared with the average diameter of the stepped diameter portions of the lower chamber 64. The largest diameter portion of the chamber 64 is adjacent the lower end of the piston body 54 as shown in FIGS. 2 and 3.

A neck passage 68 interconnects the upper and lower chambers 62 and 64. The central longitudinal axes of the chambers 62 and 64 and the neck passage 68 are coaxial with the longitudinal axes of the piston body 54 and the piston assembly 24. The chambers 62 and 64, and the neck passage 68 are symmetrical about their longitudinal axes.

A valve assembly 72 is mounted about the upper portion 56 of the piston body 54. The assembly 72 is of conventional design and construction and is used to control the flow of fluid from the compression chamber 34 to the extension chamber 32 when the piston assembly 24 moves in its compression stroke direction. More specifically, the assembly 72 includes an O-ring 74, an annular ring 76 and a support ring member 78. The lower end of a coil compression spring 82 abuts against and biases the support member 78, together with the O-ring 74 and ring 76, against an external shoulder 84, which is defined between the upper and lower portions 56 and 58 of the piston body 54. The upper end of the coil compression spring 82 abuts an annular member 86, which is disposed about the piston rod 26 adjacent the upper end of the body portion 56.

A plurality of restrictor openings 88, one of which is shown in FIG. 1, permits fluid to flow from the extension chamber 32 into the upper chamber 62, and more particularly, the portion of the upper chamber 62 below the lower end 28 of the piston rod 26. As noted above, the upper chamber 62 is in fluid communication with the lower chamber 64 through the neck passage 68, which is defined by a central wall portion 92 of the piston body 54. The lower facing surface of this central wall portion 92 defines a valve seat 94. A spring biased blow-off valve assembly 96 abuts the valve seat 94.

As is conventional, however, a plurality of orifices 98 (two of which are shown in FIGS. 2 and 3) are coined in the valve seat 94. The orifices permit a relatively small, predetermined volume of fluid to flow from the upper chamber 62 to the lower chamber 64, particularly when the piston assembly is moved in its recoil stroke direction, even though the blow-off valve assembly 96 is otherwise closed.

The blow-off valve assembly 96 may be of any conventional construction design and includes a valve member 102. The assembly 96, as shown in FIGS. 2 and 3, is like the blow-off valve assembly that has been described above as having been used in "premium" shock absorbers. The blow-off valve assembly 96 could, however, be like those assemblies, which were used in the non-premium shock absorbers, where the valve member 102 is a solid and does not permit any fluid to flow through the valve member.

More particularly, a compression spring 104 biases the valve member 102 against the valve seat 94. The lower end of the spring 104 abuts against a closure member 106 that is mounted in the lower end of the lower portion 58 of the piston body 54 and that defines and closes the lower end of the lower chamber 64. A spring clip member 108 is mounted in the upper surface of the closure member 106 within the coils of the spring 104. The upper end of the spring 104, as shown in FIGS. 2 and 3, is abutted against the lower facing surface of the valve member 102.

The valve member 102 includes an upper part 112, which has a central circular opening 114 in its upper facing surface. A lower part 116 of the member 102 is disposed and mounted within the side edges of the upper part 112 and has a central circular opening 118 in its lower facing surface. A gap or space 122 is defined between the central portions of the parts 112 and 116. A relatively thin, flexible disk 124 is secured within the space 122 by having its peripheral edge clamped between the parts 112 and 116. The disk has a plurality of apertures 126 adjacent its peripheral edge. The unclamped central portion of the disk 124 will deflect under predetermined fluid pressure from its normal, flat disposition. When it is in its normal flat position, as shown in FIG. 2, the disk 124 permits a predetermined volume of fluid to flow through the opening 114 into the space 122, through the apertures 126 and out of the space 122 through the opening 118. When the volume of flow exceeds a predetermined amount—due to increased piston assembly velocity—the disk 124 will flex or bend and will be deflected downwardly so as to block the fluid flow by reason of the central portion of the disk abutting the upper facing surface of the part 116 as shown in FIG. 3.

As explained above, the disk 124 will deflect—and block fluid flow through the valve member 102—as a result of the velocity of the piston assembly 24 in the recoil direction exceeding a predetermined speed. Thereafter, a further increase in the velocity will overcome the biasing force of the spring 104 so that the valve member 102 will move away from its abutment against the valve seat 94. This opening of the blow-off valve assembly 96 permits a much larger volume of fluid flow from the chamber 62 to the chamber 64 than the predetermined volumes of fluid flow permitted to flow through the orifices 98 and/or by the disk 124.

As also noted above, the foregoing description of the valving and fluid flow through the piston assembly 24, when the assembly 24 is moved relatively with respect to the inner tube 14 in a recoil stroke direction, is conventional. In this regard, any of a variety of other constructions and designs of the piston assembly and/or of its component parts—other than those shown in FIGS. 2 and 3—may be used as will be well recognized by those working in this art.

A principal novel feature of the piston assembly 24 of the present invention is the inclusion of a second valve 132 downstream from the blow-off valve assembly 96, that is, downstream considering the fluid flow during recoil stroke motion of the piston assembly. The valve 132 includes an annular, relatively stiff (non-flexible) disk 134, which serves as a valve member. The annular disk 134 has an outer diameter sufficient to overlay and thus block fluid flow through the plurality of the openings 136 in the closure member 106. The openings 136 define valve seats about their peripheries, are spaced radially outwardly from the central longitudinal axis of the piston body 54 from the spring 104 and are of a size such that all of the fluid flowing into the lower chamber 64 may readily flow from the lower chamber 64 into the compression chamber 34 when the valve 132 is open.

A coil compression spring 138 biases the annular disk 134 against the lower facing surface (as shown in FIGS. 2 and 3) of the closure member 106 with a force that is selected to be less than the force the spring 104 exerts on the valve member 102. The longitudinal central axes of the springs 104 and 138 are coaxial with the central longitudinal axis of the piston body 54. The lower end of the spring 138 abuts a spring retention 142 member mounted at the lower end of a cylindrical guide 144. The central opening of the annular disk 134 fits about the guide 144, which serves to guide the movement of the disk 134, up and down, toward and away from its abutment against the member 106.

As noted above, fluid flow through the piston body 54 from the extension chamber 32 to the compression chamber 34, as the piston assembly 24 moves relatively in the recoil stroke direction, occurs in a conventional manner, except for the fluid flow control exerted by the valve 132. Specifically, fluid flows into the upper chamber 62 through the restrictor openings 88 and through the orifices 94 into the lower chamber 64 as long as the velocity of the piston assembly 24, in the recoil stroke direction, remains relatively low, as for example, below 0.20 FPS. Also if desired, the valve member 102 may include the disk 124 which permits additional flow to pass through the valve member 102 providing a softer ride. The disk 124 will close when the velocity of the piston assembly increases (for example, 0.50 FPS or above) such that the pressure resulting on the disk, from the flow of fluid, causes the disk to deflect and block further flow. Thereafter, if the velocity of the piston assembly 24 increases further (as, for example, above 0.50 FPS), an increased volume of flow through the piston assembly is permitted by reason of the opening of the blow-off valve assembly 96 against the bias of the spring 104.

The addition of the valve 132 to the piston assembly 24 adds an initial firmness to the suspension movement before the blow-off valve 102 opens. More specifically, this valve 132 affords a firmness vis-a-vis roll stability and eliminates "float" to the vehicle steering while also providing the desired boulevard or soft ride that is particularly desired by some of the consumers.

The force exerted by the spring 138 is less than the force exerted by the spring 104 so that the valve 132 opens fully before the blow-off valve assembly 96 opens. In other words, the valve 132 will permit fluid to flow from the chamber 64 to the compression chamber 34 during movement of the piston assembly in the recoil stroke direction (at a velocity of, for example, above 0.20 FPS) before the blow-off valve assembly 96 opens.

In conclusion, the present invention, and the manner and process of making and using it, has been described in its preferred and best form in such full, clear, concise and exact terms so as to enable any person skilled in the shock absorber art to make and use the same. It is, however, to be understood that the present disclosure of the preferred embodiment has been made only by way of example and numerous changes in the details of construction and design, and in the combination and arrangement of the parts may be utilized without departing from the spirit or the scope of the invention.

What is claimed is:

1. In a shock absorber adapted for connection between the body of a motor vehicle and the suspension of the motor vehicle and for damping vibrations transmitted from the suspension to the body while the vehicle is being driven, the shock absorber including: an inner tube having a first fluid filled cylindrical inner cavity therein, that has a compression end and an extension end, and that has a longitudinal central axis extending between the compression end and the extension end, a piston assembly that has a longitudinal central axis which is co-axial with the longitudinal central axis of the inner tube, that is disposed within the first cavity, that has a second internal chamber, that has a third chamber, that is reciprocally moveable within the inner cavity, parallel with the longitudinal central axis of the inner tube, selectively in a recoil stroke direction, where the piston assembly moves toward the extension end, and in a compression stroke direction, where the piston assembly moves toward the compression end, and that serves to divide the inner cavity into a compression working chamber, which is adjacent to the compression end of the inner tube, and an extension working chamber, which is adjacent to the extension end of the inner tube; at least one restrictor opening that permits restrictive flow of fluid between the extension chamber and the second chamber of the piston assembly during movement of the piston assembly in the recoil stroke direction; at least one orifice that is in the piston assembly and that permits a first predetermined volume of fluid to flow between the second chamber and the third chamber during relatively low velocity movement of the piston assembly in the recoil stroke direction; a blow-off valve assembly that is disposed in the piston assembly between the second chamber and the third chamber, that when opened, permits a relatively large volume of fluid, as compared to the first predetermined volume of fluid flow, to flow from the second chamber to the third chamber, and that is normally biased closed with a first predetermined biasing force which is overcome so as to permit the blow-off valve to open when the piston assembly moves in the recoil stroke direction at a velocity in excess of a first predetermined velocity; and a piston rod that has a longitudinal central axis, which is co-axial with the longitudinal central axis of the inner tube, that has an inner end, which is connected with the piston assembly, and that has an outer end, which extends out of the extension end of the inner tube; the improvement comprising:

a second valve that is disposed in the piston assembly between the blow-off valve assembly and the compression chamber, that when open, permits a relatively large volume of fluid, as compared to the first predetermined volume of fluid, to flow from the third chamber to the compression chamber, and that is normally biased to a closed position with a second predetermined biasing force, which is less than the first predetermined biasing force and which is overcome so as to permit the second valve to open when the piston assembly moves in the recoil stroke direction at a second predetermined velocity that is less than the first predetermined velocity, so that the second valve in the piston assembly provides an initial firmness to the shock absorber damping before the blow-off valve opens and affords the shock absorber a firmness in regard to the roll stability to the vehicle steering yet providing a relatively soft cushioned or boulevard ride for the vehicle.

2. The improved shock absorber of claim 1 wherein a restrictor opening is disposed in the piston assembly; and wherein the third chamber is an internal chamber within the piston assembly and defined between the blow-off valve assembly and the second valve.

3. The improved shock absorber of claim 1 wherein the piston assembly has a first end adjacent to the compression chamber; wherein a first valve, seat is defined adjacent to the first end of the piston assembly; wherein the second valve includes a second valving member; and wherein a first coil compression spring biases the second valving member against the first valve seat to close the second valve.

4. The improved shock absorber of claim 3 wherein the first valve seat is annular; wherein the first coil compression spring is disposed without the third chamber; wherein the longitudinal central axis of the first coil compression spring is coaxial with the central longitudinal axis of the inner tube; and wherein the first valve seat is annularly disposed about the longitudinal central axis of the piston assembly.

5. The improved shock absorber of claim 3 wherein a second valve seat is disposed between the second chamber and the third chamber of the piston assembly; wherein the blow-off valve assembly is biased against the second valve seat by a second coil compression spring so as to prevent flow through the blow-off valve assembly; and wherein the biasing force exerted by the second coil compression spring is greater than the biasing force exerted by the first coil compression spring.

6. The improved shock absorber of claim 5 wherein the first and second coil compression springs have coaxial longitudinal central axes; wherein a restrictor opening is disposed in the piston assembly; and wherein the third chamber is an internal chamber within the piston assembly and defined between the blow-off valve assembly and the second valve.

7. The improved shock absorber of claim 5 wherein each orifice is coined in the second valve seat and permits the first predetermined volume of fluid to flow across the second valve seat and from the second chamber to the third chamber when the blow-off valve assembly is biased against the second valve seat.

8. The improved shock absorber of claim 1 wherein the blow-off valve assembly includes a normally open, third valving member that permits a third predetermined volume of fluid to flow of fluid through the blow-off valve assembly from the second chamber to the third chamber as long as the velocity at which the piston assembly moves in the recoil stroke direction is less than a third predetermined velocity, which is less than the first and second predetermined velocities at which the second valve and the blow-off valve assembly are opened and moved away from the first valve seat and the second valve seat, respectively, against the bias force of the first and second coil compression springs, as a result of the movement of the piston assembly in the recoil stroke direction.

9. The improved shock absorber of claim 8 wherein the first valve seat is annular; wherein the first coil compression spring is disposed without the third chamber; wherein the longitudinal central axis of the first coil compression spring is coaxial with the central longitudinal axis of the inner tube; and wherein the first valve seat is annularly disposed about the longitudinal central axis of the piston assembly.

10. The improved shock absorber of claim 9 wherein the piston assembly has a first end adjacent to the compression chamber; wherein a first valve seat is defined adjacent to the first end of the piston assembly; wherein the second valve includes a second valving member; and wherein a first coil compression spring biases the second valving member against the first valve seat to close the second valve.

11. The improved shock absorber of claim 10 wherein a second valve seat is disposed between the second chamber and the third chamber of the piston assembly; and wherein the blow-off valve assembly is biased against the second valve seat by a second coil compression spring; and wherein the biasing force exerted by the second coil compression spring is greater than the biasing force exerted by the first coil compression spring.

12. The improved shock absorber of claim 11 wherein the first and second coil compression springs have coaxial longitudinal central axes.

13. The improved shock absorber of claim 12 wherein each orifice is coined in the second valve seat and permits the first predetermined volume of fluid to flow across the second valve seat and from the second chamber to the third chamber when the blow-off valve assembly is closed.

14. The improved shock absorber of claim 13 wherein a restrictor opening is disposed in the piston assembly; and wherein the third chamber is an internal chamber within the piston assembly and defined between the blow-off valve assembly and the second valve.

* * * * *